US009858077B2

(12) United States Patent
Brown et al.

(10) Patent No.: US 9,858,077 B2
(45) Date of Patent: Jan. 2, 2018

(54) ISSUING INSTRUCTIONS TO EXECUTION PIPELINES BASED ON REGISTER-ASSOCIATED PREFERENCES, AND RELATED INSTRUCTION PROCESSING CIRCUITS, PROCESSOR SYSTEMS, METHODS, AND COMPUTER-READABLE MEDIA

(71) Applicant: QUALCOMM Incorporated, San Diego, CA (US)

(72) Inventors: Melinda J. Brown, Raleigh, NC (US); James N. Dieffenderfer, Apex, NC (US); Michael W. Morrow, Wilkes Barre, PA (US); Brian M. Stempel, Raleigh, NC (US); Michael S. McIlvaine, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 13/741,849

(22) Filed: Jan. 15, 2013

(65) Prior Publication Data
US 2013/0326197 A1 Dec. 5, 2013

Related U.S. Application Data

(60) Provisional application No. 61/655,655, filed on Jun. 5, 2012.

(51) Int. Cl.
*G06F 15/00* (2006.01)
*G06F 9/30* (2006.01)
(Continued)

(52) U.S. Cl.
CPC .......... *G06F 9/3836* (2013.01); *G06F 9/3826* (2013.01); *G06F 9/3838* (2013.01); *G06F 9/3885* (2013.01)

(58) Field of Classification Search
CPC .............................. G06F 9/3826; G06F 9/3838
See application file for complete search history.

(56) References Cited

U.S. PATENT DOCUMENTS 5,021,945 A * 6/1991 Morrison ................ G06F 8/445
712/216
5,941,983 A 8/1999 Gupta et al.
(Continued)

FOREIGN PATENT DOCUMENTS

CN 1340760 A 3/2002
CN 1363063 A 8/2002
(Continued)

OTHER PUBLICATIONS

International Search Report and Written Opinion—PCT/US2013/044125—ISA/EPO—dated Sep. 16, 2013.
(Continued)

*Primary Examiner* — George Giroux
(74) *Attorney, Agent, or Firm* — Qualcomm Incorporated

(57) ABSTRACT

Issuing instructions to execution pipelines based on register-associated preferences and related instruction processing circuits, systems, methods, and computer-readable media are disclosed. In one embodiment, an instruction is detected in an instruction stream. Upon determining that the instruction specifies at least one source register, an execution pipeline preference(s) is determined based on at least one pipeline indicator associated with the at least one source register in a pipeline issuance table, and the instruction is issued to an execution pipeline based on the execution pipeline preference(s). Upon a determination that the instruction specifies at least one target register, at least one pipeline indicator associated with the at least one target register in the pipeline issuance table is updated based on the execution pipeline to which the instruction is issued. In this (Continued)

manner, optimal forwarding of instructions may be facilitated, thus improving processor performance.

22 Claims, 8 Drawing Sheets

(51) Int. Cl.
*G06F 9/40* (2006.01)
*G06F 9/38* (2006.01)

(56) References Cited

U.S. PATENT DOCUMENTS

| | | | |
|---|---|---|---|
| 5,956,747 A * | 9/1999 | Wilhelm | G06F 9/30138 |
| | | | 711/140 |
| 5,963,723 A | 10/1999 | Le | |
| 6,047,369 A | 4/2000 | Colwell et al. | |
| 6,260,135 B1 | 7/2001 | Yoshida | |
| 6,330,661 B1 | 12/2001 | Torii | |
| 6,643,762 B1 * | 11/2003 | Arnold | G06F 9/3836 |
| | | | 712/1 |
| 6,728,866 B1 | 4/2004 | Kahle et al. | |
| 6,754,807 B1 * | 6/2004 | Parthasarathy | G06F 9/3836 |
| | | | 711/125 |
| 7,571,302 B1 | 8/2009 | Chen et al. | |
| 7,774,582 B2 | 8/2010 | Williamson et al. | |
| 8,055,883 B2 * | 11/2011 | Lutz | G06F 9/3016 |
| | | | 712/214 |
| 2004/0181651 A1 * | 9/2004 | Sugumar | G06F 9/3836 |
| | | | 712/214 |
| 2005/0149698 A1 * | 7/2005 | Yeh | G06F 9/3836 |
| | | | 712/217 |
| 2006/0190710 A1 | 8/2006 | Rychlik | |
| 2007/0260856 A1 | 11/2007 | Tran et al. | |
| 2011/0208950 A1 | 8/2011 | Tran et al. | |
| 2012/0023314 A1 | 1/2012 | Crum et al. | |

FOREIGN PATENT DOCUMENTS

| | | |
|---|---|---|
| JP | H10143365 A | 5/1998 |
| JP | H10275078 A | 10/1998 |
| JP | 2007026452 A | 2/2007 |
| WO | 2006091778 A2 | 8/2006 |

OTHER PUBLICATIONS

Tsunoda T., et al., "Issue Control Logic Implementation and Delay Improvement for Multimedia Processor SH4-CPU", Technical, Report of the Institute of Electronics, Information and Communication Engineers, The Institute of Electronics, Information and Communication Engineers, Oct. 1999, vol. 99, No. 401, pp. 89-96.

* cited by examiner

ISSUING INSTRUCTIONS TO EXECUTION PIPELINES BASED ON REGISTER-ASSOCIATED PREFERENCES, AND RELATED INSTRUCTION PROCESSING CIRCUITS, PROCESSOR SYSTEMS, METHODS, AND COMPUTER-READABLE MEDIA

BACKGROUND

I. Field of the Disclosure

The technology of the disclosure relates generally to processing of pipelined computer instructions in central processing unit (CPU)-based systems.

II. Background

The advent of "instruction pipelining" in modern computer architectures has yielded improved utilization of CPU resources and faster execution times of computer applications. Instruction pipelining is a processing technique whereby a throughput of instructions being processed by a CPU may be increased by splitting the processing of each instruction into a series of steps. The instructions are executed. in an "execution pipeline" composed of multiple stages, with each stage carrying out one of the steps for each of a series of instructions. As a result, in each CPU clock cycle, steps for multiple instructions may be evaluated in parallel. A CPU may optionally employ multiple execution pipelines to further boost performance.

Occasionally, circumstances may arise wherein an instruction is preventedfrom executing during its designated CPU clock cycle in an execution pipeline. For instance, a data dependency may exist between a first instruction and a subsequent instruction (i.e., the subsequent instruction may require data generated by an operation provided by the first instruction). If the first instruction has not completely executed before the subsequent instruction begins execution, the data required by the subsequent instruction may not yet be available when the subsequent instruction executes, and therefore a pipeline "hazard" (specifically, a "read after write hazard") will occur. To resolve this hazard, the CPU may "stall" or delay execution of the subsequent instruction until the first instruction has completely executed. To help avoid having to stall the subsequent instruction, the CPU may alternatively employ a technique known as "pipeline forwarding." Pipeline forwarding may prevent the need for stalling execution of the subsequent instruction by allowing a result of the first executed instruction to be accessed by the subsequent instruction without requiring the result to be written to a register and then read back from the register by the subsequent instruction.

Pipeline forwarding may take place between instructions executing within the same execution pipeline, a process which may be more specifically referred to as "intra-pipeline forwarding." In addition, pipeline forwarding may occur between instructions executing in separate execution pipelines, wherein the process is conventionally referred to as "inter-pipeline forwarding." A CPU may be configured to provide intra-pipeline forwarding within a single execution pipeline more efficiently and from more access points than inter-pipeline forwarding between two separate execution pipelines. While the performance of inter-pipeline forwarding may be improved by expanding the CPU's forwarding circuitry to effectively add more access points, a tradeoff may exist in the form of increased complexity of the CPU architecture.

SUMMARY OF THE DISCLOSURE

Embodiments of the disclosure provide issuing instructions to execution pipelines based on register-associated preferences. Related instruction processing circuits, processor systems, methods, and computer-readable media are also disclosed. In this regard, in one embodiment, a method for processing computer instructions is provided. The method comprises detecting an instruction in an instruction stream. Upon determining that the instruction specifies at least one source register, at least one execution pipeline preference for the instruction is determined based on at least one pipeline indicator associated with the at least one source register in a pipeline issuance table, and the instruction is issued to an execution pipeline based on the at least one execution pipeline preference. The method additionally comprises, upon determining that the instruction specifies at least one target register, updating at least one pipeline indicator associated with the at least one target register in the pipeline issuance table based on the execution pipeline to which the instruction is issued. In this manner, optimal forwarding of instructions may be facilitated, thus improving processor performance.

In another embodiment, a processor comprising an instruction processing circuit is provided. The instruction processing circuit comprises an instruction detection circuit configured to detect an instruction in an instruction stream, and a pipeline issuance table. The instruction processing circuit further comprises a source register detection circuit and a target register detection circuit. The source register detection circuit is configured to determine whether the instruction specifies at least one source register. In response to determining that the instruction specifies the at least one source register, the source register detection circuit is configured to determine at least one execution pipeline preference for the instruction based on at least one pipeline indicator associated with the at least one source register in the pipeline issuance table. The target register detection circuit is configured to determine whether the instruction specifies at least one target register. In response to determining that the instruction specifies the at least one target register, the target register detection circuit is configured to update at least one pipeline indicator associated with the at least one target register in the pipeline issuance table based on the execution pipeline to which the instruction is issued. The processor is configured to issue the instruction to an execution pipeline based on the at least one execution pipeline preference, responsive to the source register detection circuit determining that the instruction specifies the at least one source register.

In another embodiment, a processor comprising an instruction processing circuit is provided. The instruction processing circuit comprises a means for detecting an instruction in an instruction stream. The instruction processing circuit further comprises a means for determining at least one execution pipeline preference for the instruction based on at least one pipeline indicator associated with at least one source register in a pipeline issuance table, responsive to determining that the instruction specifies the at least one source register. The instruction processing circuit also comprises a means for issuing the instruction to an execution pipeline based on the at least one execution pipeline preference, responsive to determining that the instruction specifies the at least one source register. The instruction processing circuit additionally comprises a means for updating at least one pipeline indicator associated with at least one target register in the pipeline issuance table based on the execution pipeline to which the instruction is issued, responsive to determining that the instruction specifies the at least one target register.

In another embodiment, a non-transitory computer-readable medium is provided, having stored thereon computer-executable instructions to cause a processor to implement a method for detecting an instruction in an instruction stream. The method implemented by the computer-executable instructions also comprises, upon determining that the instruction specifies at least one source register, determining at least one execution pipeline preference for the instruction based on at least one pipeline indicator associated with the at least one source register in a pipeline issuance table, and issuing the instruction to an execution pipeline based on the at least one execution pipeline preference. The method implemented by the computer-executable instructions additionally comprises, upon determining that the instruction specifies at least one target register, updating at least one pipeline indicator associated with the at least one target register in the pipeline issuance table based on the execution pipeline to which the instruction is issued.

DETAILED DESCRIPTION

Figure 1:
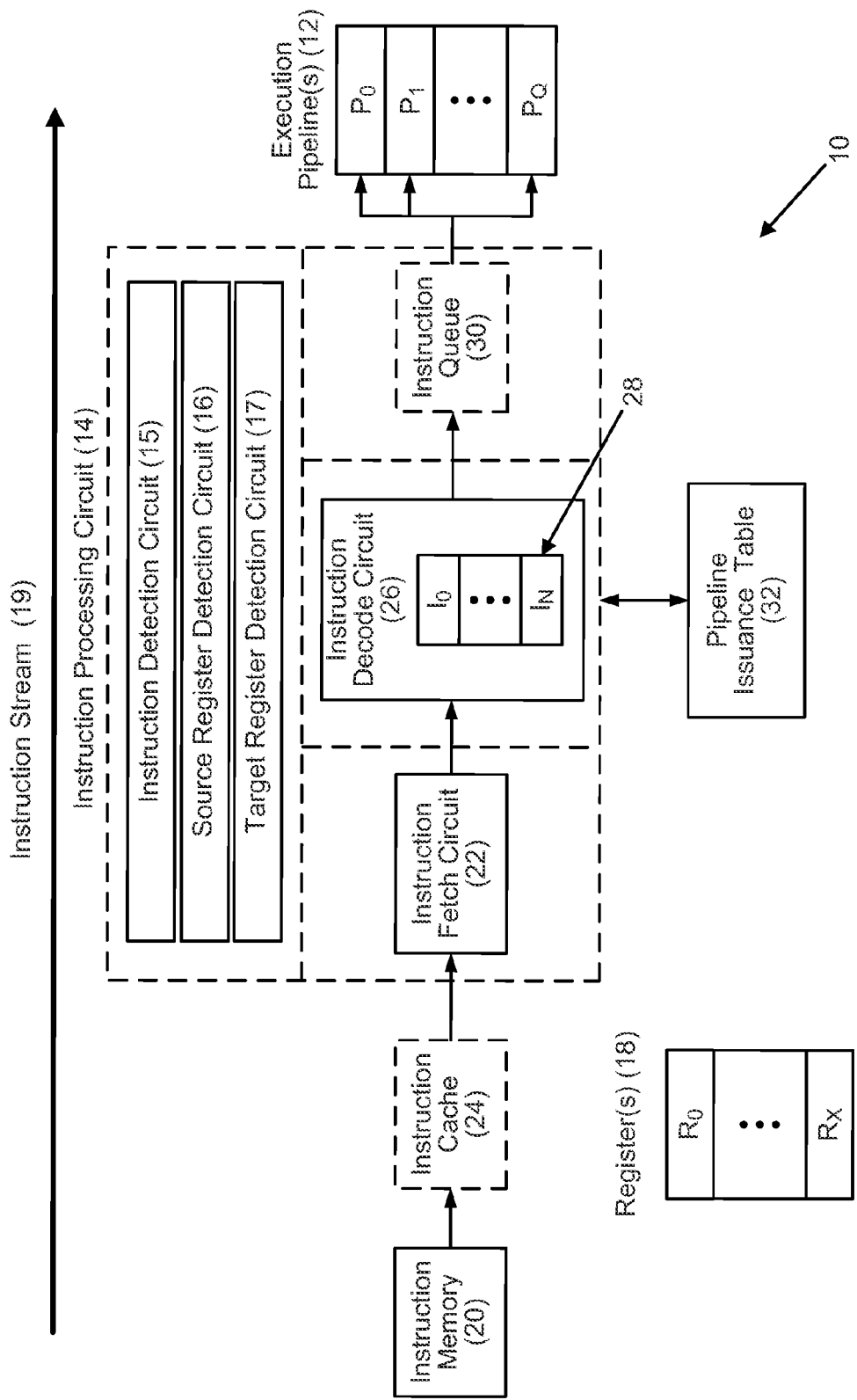
FIG. 1 is a block diagram of exemplary components provided in a processor-based system for retrieving and processing computer instructions to be placed into one or more execution pipelines, including an exemplary instruction processing circuit configured to issue instructions to the one or more execution pipelines based on register-associated preferences.

With reference now to the drawing figures, several exemplary embodiments of the present disclosure are described. The word "exemplary" is used herein to mean "serving as an example, instance, or illustration." Any embodiment described herein as "exemplary" is not necessarily to he construed as preferred or advantageous over other embodiments.

Embodiments of the disclosure provide issuing instructions to execution pipelines based on register-associated preferences. Related instruction processing circuits, processor systems, methods, and computer-readable media are also disclosed. In this regard, in one embodiment, a method for processing computer instructions is provided. The method comprises detecting an instruction in an instruction stream. Upon determining that the instruction specifies at least one source register, at least one execution pipeline preference for the instruction is determined based on at least one pipeline indicator associated with the at least one source register in a pipeline issuance table, and the instruction is issued to an execution pipeline based on the at least one execution pipeline preference. The method additionally comprises, upon determining that the instruction specifies at least one target register, updating at least one pipeline indicator associated with the at least one target register in the pipeline issuance table based on the execution pipeline to which the instruction is issued. In this manner, optimal forwarding of instructions may be facilitated, thus improving processor performance.

In this regard, FIG. 1 is a block diagram of an exemplary processor-based system 10 for issuing instructions to execution pipelines 12(0-Q) (referred to herein as $P_0$-$P_Q$, respectively) based on register-associated preferences. As will be discussed in more detail below, the processor-based system 10 provides an instruction processing circuit 14 that is configured to determine execution pipeline preferences for the instructions. In some embodiments, the instruction processing circuit may include an instruction detection circuit 15, a source register detection circuit 16, and a target register detection circuit 17. The instructions processed by the instruction processing circuit 14 may indicate operations for reading data from and/or writing data to registers 18(0-X) (referred to herein as $R_0$-$R_X$, respectively), which provide local high-speed storage accessible by the processor-based system 10. As discussed herein, "instructions" may refer to a combination of bits defined by an instruction set architecture that directs a computer processor to carry out a specified task or tasks. Exemplary instruction set architectures include, but are not limited to, ARM, Thumb, and A64 architectures.

With continuing reference to FIG. 1, the instructions are processed. in the processor-based system 10 in a continuous flow represented by an instruction stream 19. The instruction stream 19 may continuously advance while the processor-based system 10 is operating and executing the instructions. In this illustrated example, the instruction stream 19 begins with an instruction memory 20, which provides persistent storage for the instructions in a computer-executable program. An instruction fetch circuit 22 reads an instruction from the instruction memory 20 and/or optionally from an instruction cache 24, and may increment a program counter, which may be stored in one of the registers 18(0-X).

Once the instruction is fetched by the instruction fetch circuit 22, it proceeds to an instruction decode circuit 26, which translates the instruction into processor-specific microinstructions. In this embodiment, the instruction decode circuit 26 holds a group of multiple instructions 28(0-N) simultaneously for decoding. After the instructions have been fetched and decoded, they are optionally issued to an instruction queue 30 (i.e., a buffer for storing instructions), or they may be issued to one of the execution pipelines 12(0-Q) for execution. In some embodiments, particular execution pipelines 12(0-Q) may restrict the types of operations that may be carried out within that particular execution pipeline. For example, pipeline $P_0$ may not permit read access to the registers 18(0-X); accordingly, an instruction that indicates an operation to read register $R_0$ may only be issued to one of the execution pipelines $P_1$ through $P_Q$.

With continuing reference to FIG. 1, the instruction processing circuit 14 is configured to determine at least one execution pipeline preference for an instruction based on at least one pipeline indicator for at least one source register, and if at least one target register is specified, to update a pipeline indicator for the at least one target register based on the one of the execution pipelines 12(0-Q) to which the instruction is issued. The instruction processing circuit 14 may be any type of device or circuit, and may be implemented or performed with a processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. In some embodiments, the instruction processing circuit 14 is incorporated into the instruction fetch circuit 22, the instruction decode circuit 26, and/or the optional instruction queue 30. The instruction processing circuit 14 may also employ a pipeline issuance table 32 configured to store one or more pipeline indicators, which associate each of the registers 18(0-X) with one of the execution pipelines 12(0-Q) in which each of the registers 18(0-X) was most recently written. The pipeline issuance table 32 comprises a plurality of rows, with each row corresponding to one of the registers 18(0-X) and including at least one pipeline indicator. According to some embodiments described herein, the at least one pipeline indicator is a Boolean flag corresponding to a respective one of the execution pipelines 12(0-Q); in some embodiments, the at least one pipeline indicator is a data value storing an identification of one of the execution pipelines 12(0-Q).

Figure 2:
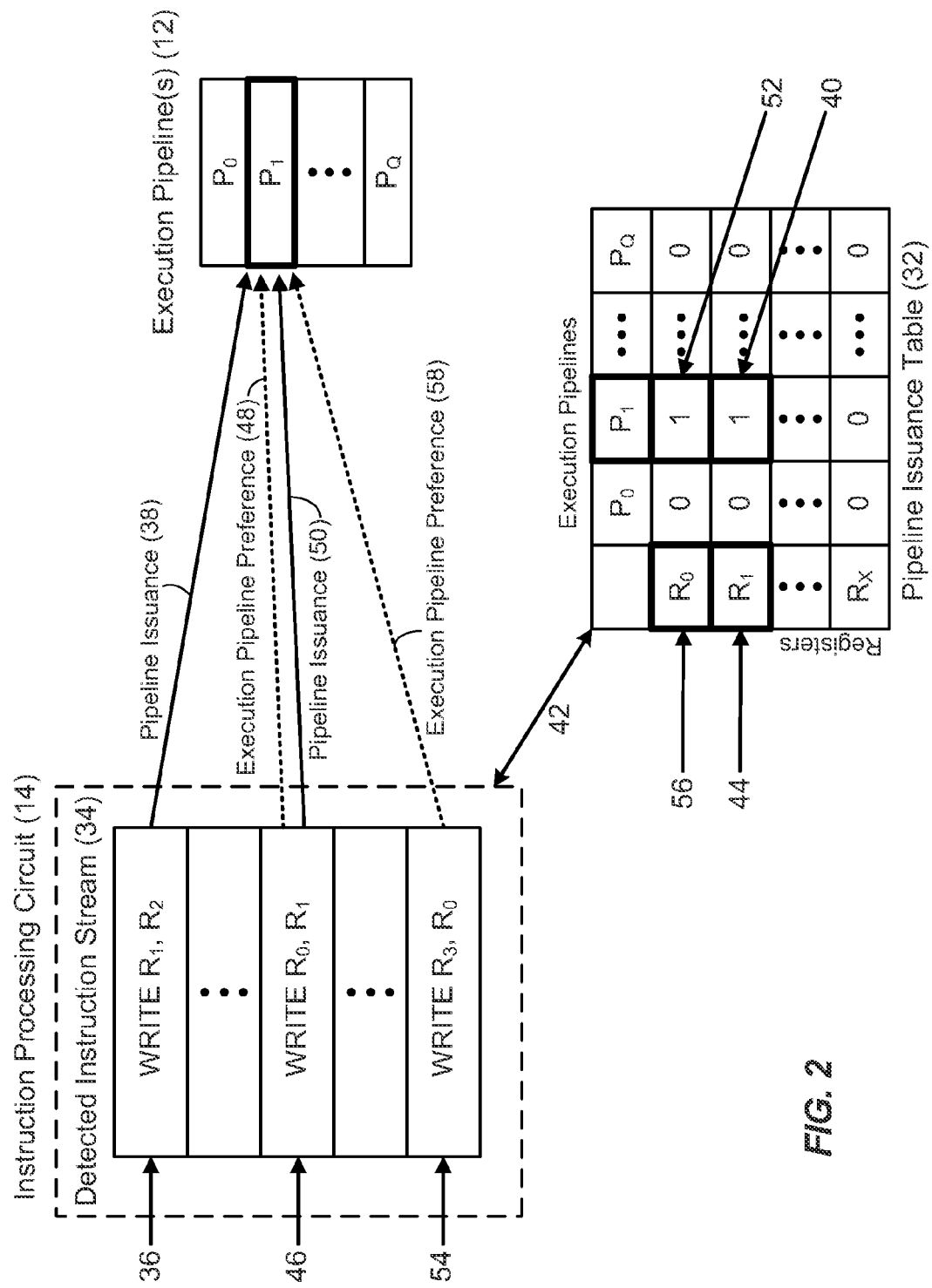
FIG. 2 is a diagram illustrating an exemplary sequence in a processor-based system including issuing a first instruction to an execution pipeline, updating a pipeline indicator in a pipeline issuance table based on the execution pipeline, and preferentially issuing a subsequent instruction to the execution pipeline based on the pipeline indicator.

To provide an illustration of an exemplary processing sequence in the processor-based system 10 of FIG. 1, FIG. 2 is provided. FIG. 2 depicts the instruction processing circuit 14 of FIG. 1 processing a detected instruction stream 34. The processing includes issuing an instruction to one of the execution pipelines 12(0-Q) based on register-associated preferences. The detected instruction stream 34 represents a series of instructions fetched from the instruction stream 19 and detected by the instruction processing circuit 14 of FIG. 1.

An instruction 36 (in this example, a WRITE instruction) fetched first from the detected instruction stream 34. The instruction 36 indicates an operation to write the contents of one of the registers 18(0-X) of FIG. 1 (in this example, a source register $R_2$) into a target register $R_1$, also one of the registers 18(0-X). As indicated by pipeline issuance arrow 38, the instruction 36 is issued to one of the execution pipelines 12(0-Q), referred. to in this example as pipeline $P_1$.

After the instruction 36 is issued to the execution pipeline $P_1$, a pipeline indicator 40, corresponding to the target register $R_1$ and the execution pipeline $P_1$, is updated in the pipeline issuance table 32 by the instruction processing circuit 14 (as indicated by arrow 42). The pipeline issuance table 32 is used to track the one of the execution pipelines 12(0-Q) to which the most recent instruction to target a given one of the registers 18(0-X) for writing was issued. In this example, the pipeline issuance table 32 contains a row corresponding to each of the registers 18(0-X), with each row containing a plurality of pipeline indicators (e.g., the pipeline indicator 40) each corresponding to one of the execution pipelines 12(0-Q). Each pipeline indicator in the pipeline issuance table 32 is thus associated with exactly one of the registers 18(0-X) and one of the execution pipelines 12(0-Q). In the embodiment depicted in FIG. 2, only one pipeline indicator may be set for a given one of the registers 18(0-X) at any given time. However, two or more of the registers 18(0-X) may each have a pipeline indicator set for the same one of the execution pipelines 12(0-Q). Accordingly, in this example, the pipeline indicator 40 is updated by clearing, all pipeline indicators in a row 44 associated with the target register $R_1$, and setting the pipeline indicator 40 to indicate that the instruction 36, which is the most recent instruction to target register $R_1$ for writing, was issued to the execution pipeline $P_1$.

The instruction processing circuit 14 next detects an instruction 46 (in this example, another WRITE instruction) in the detected instruction stream 34. The instruction 46 specifies the register $R_1$ as a source register, and indicates an operation to write the contents of the source register $R_1$ into a target register $R_0$ (one of the registers 18(0-X)). It is to be understood that the instruction 46 may be fetched immediately following the instruction 36 in the detected instruction stream 34, or the instruction 36 and the instruction 46 may be separated in the detected instruction stream 34 by other intervening instructions.

After the instruction 46 is detected, the pipeline issuance table 32 is accessed by the instruction processing circuit 14 (as indicated by arrow 42) to determine whether a pipeline indicator is set in the row 44 for the source register $R_1$. In this example, the pipeline indicator 40 in the pipeline issuance table 32 is set, indicating that the most recent instruction to target the source register $R_1$ for writing (here, the instruction 36) was issued to the execution pipeline $P_1$. Based on the pipeline indicator 40, the instruction processing circuit 14 determines an execution pipeline preference 48, which indicates that the instruction 46 should be preferentially issued to the execution pipeline $P_1$. It is to be understood that, in some embodiments, the instruction 46 may be associated with a plurality of execution pipeline preferences 48, based on a plurality of pipeline indicators corresponding to a plurality of source registers for the instruction 46. It is to be further understood that, in some embodiments, there may be no guarantee that the instruction 46 will actually be issued to the execution pipeline $P_1$, as indicated by the execution pipeline preference 48. Rather, the execution pipeline preference 48 may be considered as one of a number of factors in determining to which one of the execution pipelines 12(0-Q) the instruction 46 will be issued.

Once the instruction 46 issues to one of the execution pipelines 12(0-Q) (whether the execution pipeline $P_1$ or another one of the execution pipelines 12(0-Q)), the exemplary process described above with respect to the instruction 36 may be repeated for the instruction 46. In this example, the instruction 46 is issued to the preferred execution pipeline $P_1$, as indicated by pipeline issuance arrow 50. A pipeline indicator 52, corresponding to the target register $R_0$ and the execution pipeline $P_1$, is updated in the pipeline issuance table 32. For a subsequent instruction 54 (in this example, another WRITE instruction) in the detected instruction stream 34 that specifies the register $R_0$ as a source register, the instruction processing circuit 14 may access the pipeline issuance table 32 to determine whether a pipeline indicator is set in a row 56 for the source register $R_0$. Based on the pipeline indicator 52, the instruction processing circuit 14 determines an execution pipeline preference 58 indicating a preference for the execution pipeline $P_1$ for issuance of the instruction 54.

Figure 3:
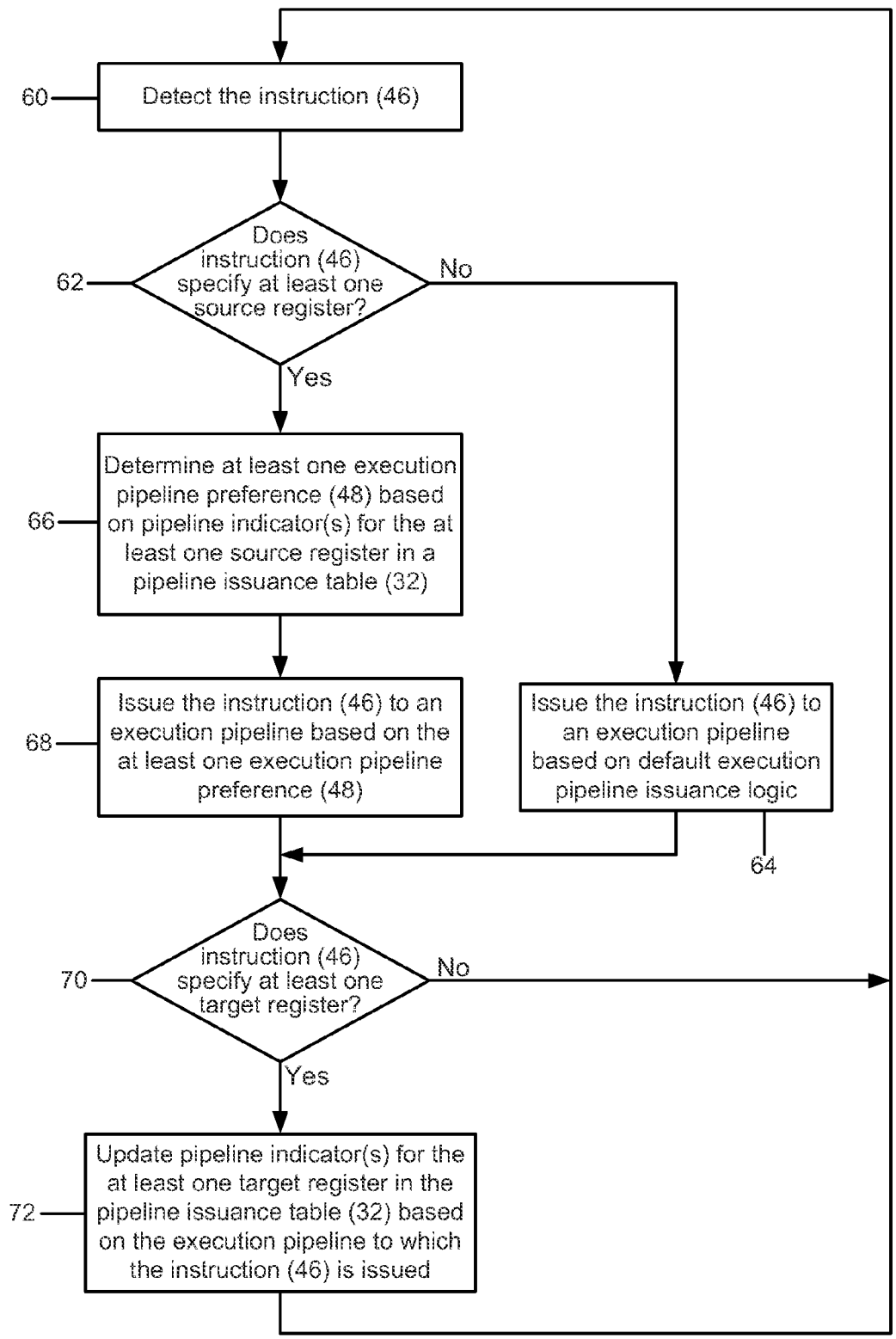
FIG. 3 is a flowchart illustrating an exemplary process of an instruction processing circuit for determining at least one execution pipeline preference for an instruction based on one or more source registers, issuing the instruction to an execution pipeline based on the at least one execution pipeline preference, and updating one or more pipeline indicators for one or more target registers based on the execution pipeline to which the instruction is issued.

To further illustrate the process of issuing instructions to execution pipelines based on register-associated preferences, an exemplary generalized process for an instruction processing circuit configured to determine execution pipeline preferences and update pipeline indicators is shown in FIG. 3, with further reference to FIGS. 1 and 2. In this example, the process begins as the instruction processing circuit 14 of FIG. 1 (not shown) detects the instruction 46 of FIG. 2, indicating a write operation to the target register $R_0$ (block 60). In some embodiments, detecting the instruction 46 may be accomplished by an instruction detection circuit such as the instruction detection circuit 15 of FIG. 1.

The instruction processing circuit 14 next determines whether the instruction 46 specifies at least one source register (block 62). Some embodiments may provide that this determination is made by a source register detection circuit of the instruction processing circuit 14, such as the source register detection circuit 16 of FIG. 1. If the instruction 46 does not specify at least one source register, the instruction 46 is issued to an execution pipeline (e.g., one of the execution pipelines $P_0$-$P_Q$) based on default execution pipeline issuance logic (block 64). If the instruction 46 does specify at least one source register, as in FIG. 2, the instruction processing circuit 14 determines at least one execution pipeline preference 48 based on the pipeline indicator(s) for the at least one source register in a pipeline issuance table 32 (block 66). In the example illustrated in FIG. 2, the execution pipeline preference 48 is based on the pipeline indicator 40 for the source register $R_1$ in the pipeline issuance table 32. The instruction 46 is then issued to an execution pipeline (in FIG. 2, the execution pipeline $P_1$) based on the at least one execution pipeline preference 48 (block 68).

Once the instruction 46 is issued to the execution pipeline, whether based on the default execution pipeline issuance logic as in block 64 or the at least one execution pipeline preference 48 as in block 68, the instruction processing circuit 14 determines whether the instruction 46 specifies at least one target register (block 70). In some embodiments, this determination may be made by a target register detection circuit of the instruction processing circuit 14, such as the target register detection circuit 17 of FIG. 1. If the instruction 46 does not specify at least one target register, processing returns to at block 60 of FIG. 3. If the instruction 46 does specify at least one target register, the instruction processing circuit 14 updates at least one pipeline indicator for the at least one target register in the pipeline issuance table 32 based on the execution pipeline to which the instruction 46 is issued (block 72). In FIG. 2, the pipeline indicator 52 for the target register $R_0$ is updated in the pipeline issuance table 32 based on the instruction 46 being issued to the execution pipeline $P_1$. Processing then resumes at block 60 of FIG. 3.

Figure 4A:
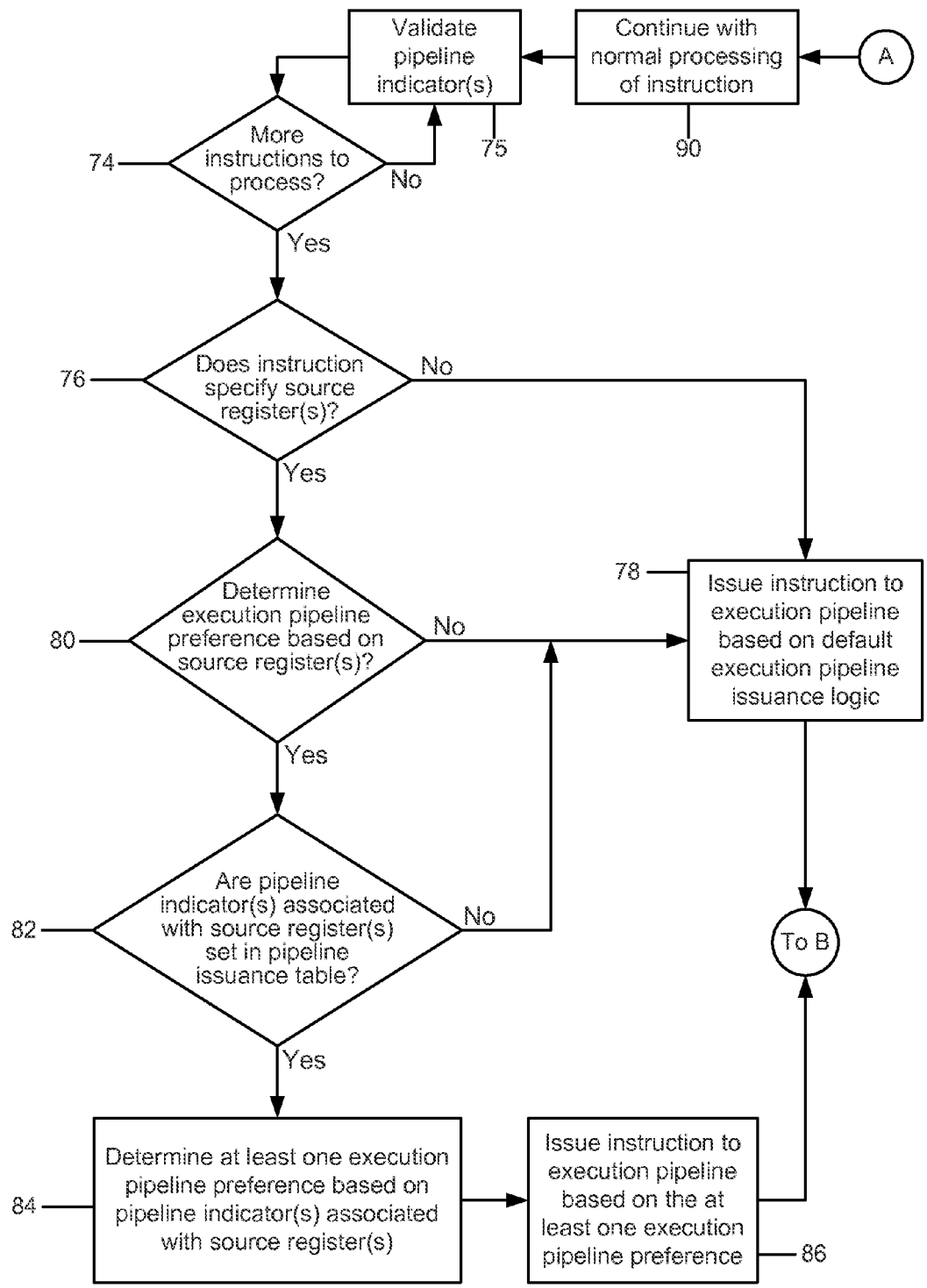
FIGS. 4A-4B are flowcharts illustrating a more detailed exemplary process of an instruction processing circuit for issuing instructions to execution pipelines based on register-associated preferences.
Figure 4B:
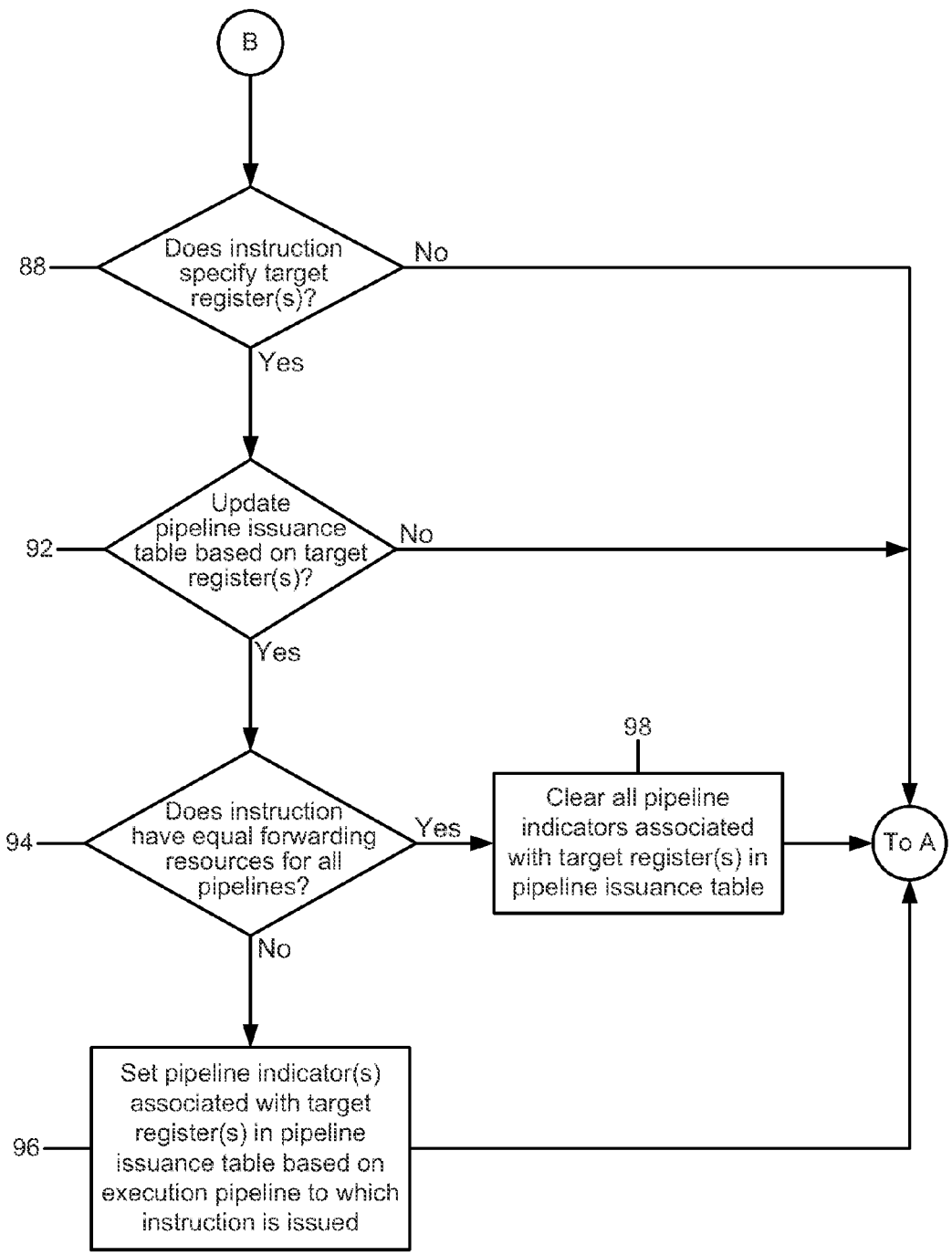

FIGS. 4A-4B illustrate a more detailed exemplary process of an instruction processing circuit (e.g., the instruction processing circuit 14 in the processor-based system 10 of FIG. 1) for detecting instructions in an instruction stream (e.g., the instruction stream 19 of FIG. 1), and issuing the instructions to execution pipelines (such as the execution pipelines 12(0-Q) of FIG. 1) based on register-associated preferences. FIG. 4A details a process for determining whether a detected instruction specifies at least one source register, and determining at least one execution pipeline preference for the instruction. FIG. 4B illustrates operations for updating a pipeline indicator (such as the pipeline indicators 40, 52 of FIG. 2) in a pipeline issuance table (for instance, the pipeline issuance table 32 of FIG. 1).

The process in this example begins in FIG. 4A with the instruction processing circuit detecting whether more instructions remain to be processed (block 74 of FIG. 4A). In sonic embodiments, this detection is accomplished by detecting a presence of unprocessed instructions in an instruction fetch circuit and/or an instruction decode circuit (such as the instruction fetch circuit 22 and/or the instruction decode circuit 26, respectively, of FIG. 1). If no remaining instructions are detected, the instruction processing circuit performs validation of any pipeline indicators stored in a pipeline issuance table (e.g., the pipeline issuance table 32 of FIG. 1). Validation may include verifying that a stored pipeline indicator remains valid for determining an execution pipeline preference for a corresponding register, and updating the pipeline issuance table accordingly (for example, by updating a validity bit for the pipeline indicator). Processing then returns to block 74 of FIG. 4A.

If a remaining instruction is detected, the instruction processing circuit determines whether the detected instruction is an instruction specifying at least one source register (such as one of the registers 18(0-X) of FIG. 1) (block 76 of FIG. 4A). Detection of such an instruction indicates that the instruction processing circuit may be able to determine at least one execution pipeline preference for the instruction. In the event that the detected instruction is not an instruction specifying at least one source register, the detected instruction is issued to an execution pipeline based on default execution pipeline issuance logic (block 78 of FIG. 4A), and processing continues to block 88 of FIG. 4B.

Returning to the decision point at block 76 of FIG. 4A, if the detectedinstruction is an instruction specifying at least one source register, the instruction processing circuit next determines whether the instruction is one for which an execution pipeline preference should be determined based on the specified source register(s) (block 80 of FIG. 4A). In some embodiments, only a subset of the instructions specifying at least one source register may be analyzed to determine an execution pipeline preference. If the instruction is not one for which an execution pipeline preference should be determined, the instruction is issued to an execution pipeline based on default execution pipeline issuance logic (block 78 of FIG. 4A), and processing continues to block 88 of FIG. 4B.

If an execution pipeline preference is to be determined for the instruction, the pipeline issuance table is accessed by the instruction processing circuit to determine whether any pipeline indicators associated with the at least one source register are set (block 82 of FIG. 4A). If no pipeline indicator associated with the at least one source register is set, the instruction is issued to an execution pipeline based on default execution pipeline issuance logic (block 78 of FIG. 4A), and processing continues to block 88 of FIG. 4B. If at least one pipeline indicator associated with the at least one source register is set, the instruction processing circuit determines at least one execution pipeline preference for the instruction based on the at least one pipeline indicator set in the pipeline issuance table (block 84 of FIG. 4A). Based on the at least one execution pipeline preference determined in block 84 of FIG. 4A, the instruction is then issued to an execution pipeline (block 86 of FIG. 4A), and processing continues at block 88 of FIG. 4B.

Referring now to FIG. 4B, the instruction processing circuit next determines whether the instruction specifies at least one target register (block 88 of FIG. 4B). If not, normal processing of the instruction continues at block 90 of FIG.

4A. Otherwise, the instruction processing circuit determines whether the pipeline issuance table should be updated based on the target register of the instruction (block 92 of FIG. 4B). In some embodiments, the pipeline issuance table may be updated only for a subset of the instructions. If the instruction is not one for which the pipeline issuance table should be updated, normal processing of the instruction continues (block 90 of FIG. 4A).

If the instruction is one for which the pipeline issuance table should be updated, the instruction processing circuit next examines whether the instruction has equal forwarding resources for all pipelines (block 94 of FIG. 4B). In some embodiments, the results of some instructions may be equally available for forwarding to subsequent instructions regardless of the execution pipelines to which the instructions and the subsequent instructions are issued. Thus, it may be said that such instructions have equal forwarding resources for all pipelines. If the detected instruction has limitedforwarding resources (i.e., if the detected instruction does not have equal forwarding resources for all pipelines), then performance of the processor-based system may be improved by preferentially issuing subsequent instructions specifying the detected instruction's target register(s) as source register(s) to the same execution pipeline as the detected instruction. Accordingly, the instruction processing circuit sets pipeline indicator(s) associated with the at least one target register in the pipeline issuance table, based on the execution pipeline to which the detected instruction was issued (block 96 of FIG. 4B). Processing then resumes at block 90 of FIG. 4A.

Returning now to the decision point at block 94 of FIG. 4B, if the instruction does have equal forwarding resources for all pipelines, preferentially issuing subsequent instructions to the same execution pipeline as the detected instruction will not result in a performance advantage, and, in fact, flexibility in issuing instructions to execution pipelines may be constrained. Thus, in that scenario, the instruction processing circuit clears all pipeline indicators associated with the detected instruction's target register(s) in the pipeline issuance table to indicate that all pipelines have equal preference (block 98 of FIG. 4B). Processing then resumes at block 90 of FIG. 4A.

Figure 5:
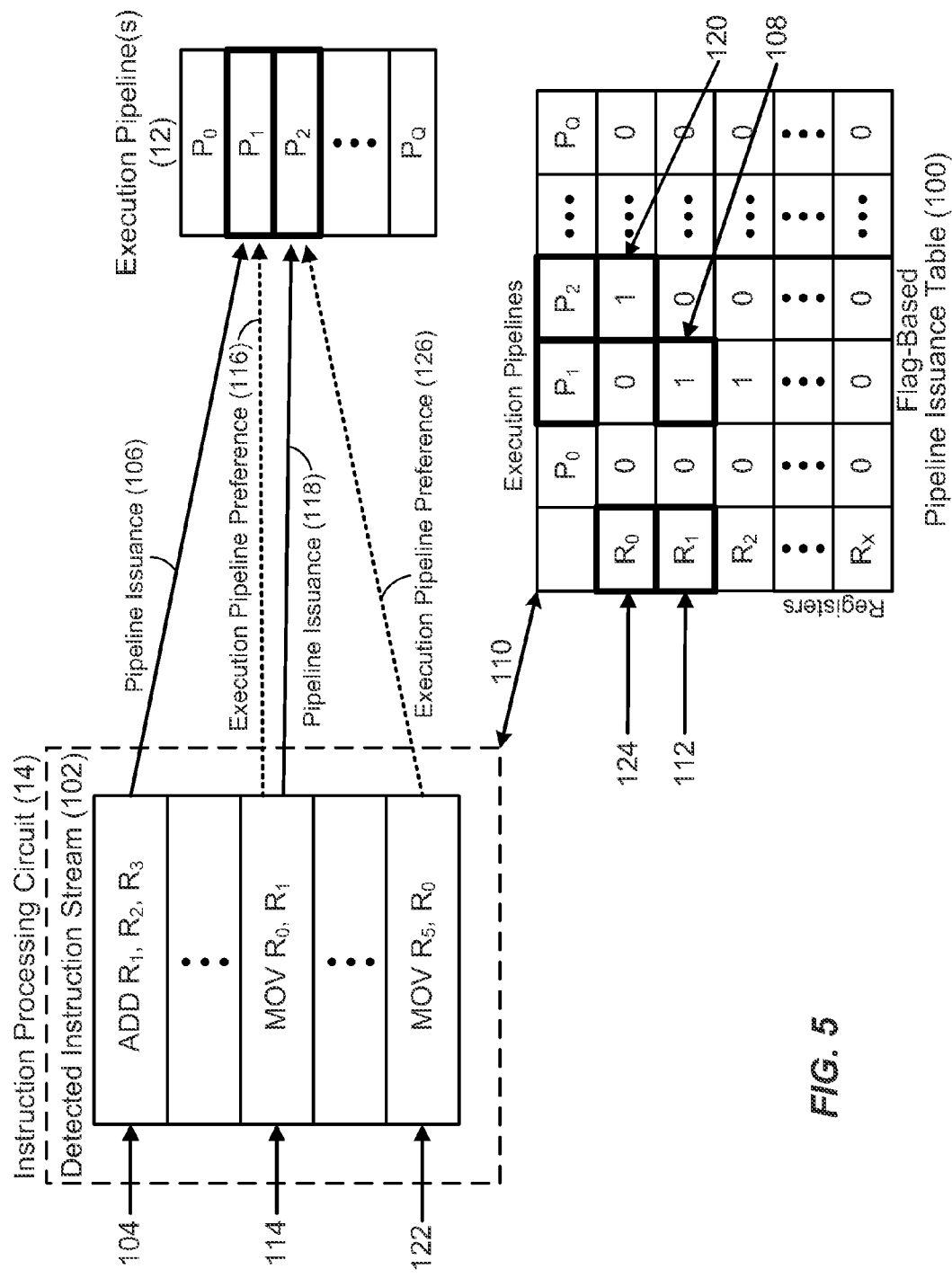
FIG. 5 is a diagram illustrating an exemplary sequence including issuing instructions to execution pipelines based on register-associated preferences stored in a flag-based pipeline issuance table.

As noted above with respect to FIG. 1, the pipeline issuance table 32 comprises a plurality of rows, with each row corresponding to one of the registers 18(0-X) and including at least one pipeline indicator. In some embodiments described herein, each pipeline indicator is a Boolean flag corresponding to one of the execution pipelines 12(0-Q). In this regard, FIG. 5 illustrates an exemplary sequence including issuing instructions to one of the execution pipelines 12(0-Q) based on register-associated preferences stored in a flag-based pipeline issuance table 100. in FIG. 5, the instruction processing circuit 14 of FIG. 1 processes a detected instruction stream 102 representing a series of instructions fetched from the instruction stream 19 and detected by the instruction processing circuit 14 of FIG. 1. The first detected instruction is an ARM architecture ADD instruction 104. The ADD instruction 104 indicates an operation to sum the contents of two of the registers 18(0-X) shown in FIG. 1 (in this example, registers $R_2$ and $R_3$), and write the result into a target register $R_1$, also one of the registers 18(0-X). As indicated by pipeline issuance arrow 106, the ADD instruction 104 is issued to one of the execution pipelines 12(0-Q), referred to in this example as pipeline $P_1$.

After the ADD instruction 104 is issued to the execution pipeline $P_1$, a pipeline indicator 108, corresponding to the target register $R_1$ and the execution pipeline $P_1$, is updated in the flag-based pipeline issuance table 100 by the instruction processing circuit 14 (as indicated by arrow 110). Each pipeline indicator in the flag-based pipeline issuance table 100 is a Boolean flag associated with exactly one of the registers 18(0-X) and one of the execution pipelines 12(0-Q). in the example shown in FIG. 5, only one pipeline indicator may be set for a given one of the registers 18(0-X) at any given time, although two or more of the registers 18(0-X) may each have a pipeline indicator set for the same one of the execution pipelines 12(0-Q). Accordingly, the pipeline indicator 108 is updated by clearing all pipeline indicators in a row 112 associated with the target register $R_1$, and setting the pipeline indicator 108 to indicate that the ADD instruction 104, which is the most recent instruction to target register $R_1$ for writing, was issued to the execution pipeline $P_1$.

The instruction processing circuit 14 next detects an ARM architecture MOV instruction 114 in the detected instruction stream 102. The MOV instruction 114 specifies the register $R_1$ as a source register, and indicates an operation to write the contents of the source register $R_1$ into a target register $R_0$ (one of registers 18(0-X)). In some embodiments, the MOV instruction 114 may be fetched immediately following the ADD instruction 104 in the detected instruction stream 102, while according to some embodiments, the ADD instruction 104 and the MOV instruction 114 may be separated in the detected instruction stream 102 by other intervening instructions.

After the MOV instruction 114 is detected, the flag-based pipeline issuance table 100 is accessed by the instruction processing circuit 14 (as indicated by arrow 110) to determine whether a pipeline indicator is set in the row 112 for the source register $R_1$. In this example, the pipeline indicator 108 in the flag-based pipeline issuance table 100 indicates that the most recent instruction to target the source register $R_1$ for writing (here, the ADD instruction 104) was issued to the execution pipeline $P_1$. Based on the pipeline indicator 108, the instruction processing circuit 14 determines an execution pipeline preference 116 for pipeline $P_1$, which indicates that the MOV instruction 114 should be preferentially issued to the execution pipeline $P_1$.

As noted above, in some embodiments there may be no guarantee that the MOV instruction 114 will actually be issued to the particular one of the execution pipelines 12(0-Q) indicated by the execution pipeline preference 116, as other factors may he taken into consideration in determining the most appropriate one of the execution pipelines 12(0-Q) to which an instruction issues. In this example, the MOV instruction 114 is issued to the execution pipeline $P_2$, as indicated by pipeline issuance arrow 118, instead of to the preferred execution pipeline $P_1$. Once the MOV instruction 114 issues to the execution pipeline $P_2$, a pipeline indicator 120, corresponding to the target register $R_0$ and the pipeline $P_2$, is then updated in the flag-based pipeline issuance table 100.

For a subsequent MOV instruction 122 in the detected instruction stream 102 that specifies the register $R_0$ as a source register, the instruction processing circuit 14 may access the flag-based pipeline issuance table 100 to determine whether a pipeline indicator is set in a row 124 for the source register $R_0$. Based on the pipeline indicator 120, the instruction processing circuit 14 determines an execution pipeline preference 126, which indicates a preference for the pipeline $P_2$ for issuance of the MOV instruction 122. Issuance of the MOV instruction 122 and updating of the flag-based pipeline issuance table 100 based on the target register(s) of the MOV instruction 122 then proceeds as described above with respect to the ADD instruction 104 and the MOV instruction 114.

Figure 6:
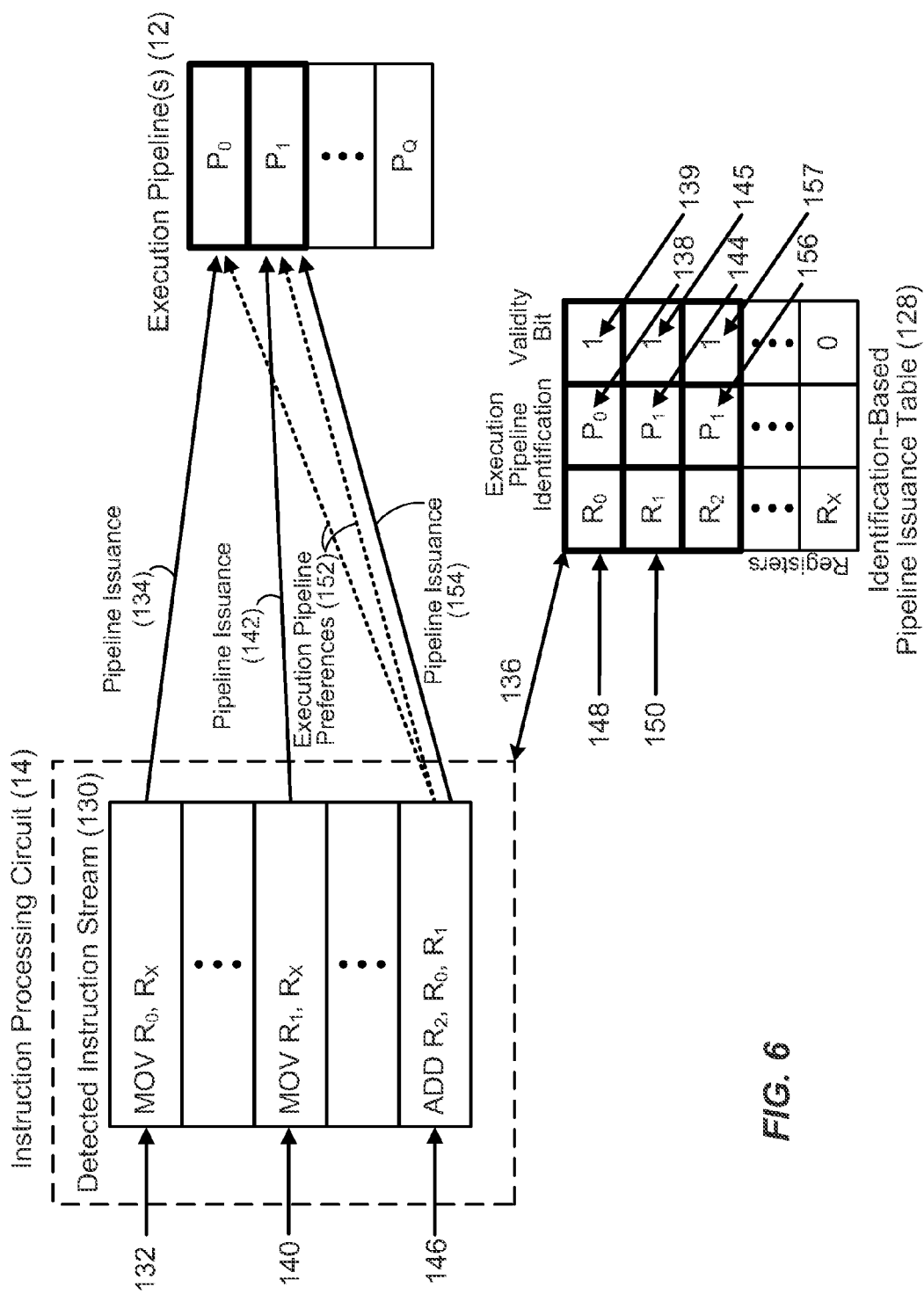
FIG. 6 is a diagram illustrating an exemplary sequence including issuing instructions to execution pipelines based on register-associated preferences stored in an identification-based pipeline issuance table.

Some embodiments may provide that each pipeline indicator stored in the pipeline issuance table 32 of FIG. 1 includes a data value storing an identification of one of the execution pipelines 12(0-Q). In this regard, FIG. 6 illustrates an exemplary sequence including issuing instructions to one of the execution pipelines 12(0-Q) based on register-associated preferences stored in an identification-based pipeline issuance table 128. In FIG. 6, the instruction processing circuit 14 of FIG. 1 processes a detected instruction stream 130 representing a series of instructions fetched from the instruction stream 19 and detected by the instruction processing circuit 14 of FIG. 1. The first detected instruction is an ARM architecture MOV instruction 132. The MOV instruction 132 indicates an operation to copy the contents of one of the registers 18(0-X) shown in FIG. 1 (in this example, source register $R_X$) into another one of the registers 18(0-X) (here, the target register $R_0$)). In this example, the source register $R_X$ does not have a pipeline indicator set in the identification-based pipeline issuance table 128, and thus is not associated with any particular execution pipeline 12(0-Q). Accordingly, as indicated by pipeline issuance arrow 134, the MOV instruction 132 is issued to one of the execution pipelines 12(0-Q) (in this example, pipeline $P_0$) based on default execution pipeline issuance logic.

After the MOV instruction 132 is issued to the execution pipeline $P_0$, the identification-based pipeline issuance table 128 is updated by the instruction processing circuit 14 (as indicated by arrow 136) to set a pipeline indicator 138, corresponding to the target register $R_0$ and the execution pipeline $P_0$. Each pipeline indicator in the identification-based pipeline issuance table 128 is a data value associated with one of the registers 18(0-X) and identifying one of the execution pipelines 12(0-Q). this example, the pipeline indicator 138 is updated. by storing an identification of the execution pipeline $P_0$ to indicate that the MOV instruction 132, which is the most recent instruction to target register $R_0$ for writing, was issued to the execution pipeline $P_0$. In some embodiments, setting a pipeline indicator may also include setting a validity bit for each pipeline indicator to indicate whether or not the pipeline indicator is valid for use in determining an execution pipeline preference for the corresponding register. Accordingly, in this example, a validity bit 139 corresponding to the pipeline indicator 138 is set by the instruction processing circuit 14 to indicate that the pipeline indicator 138 is valid for use in determining an execution pipeline preference for target register $R_0$.

The instruction processing circuit 14 next detects a subsequent ARM architecture MOV instruction 140 in the detected instruction stream 130. The MOV instruction 140 indicates an operation to copy the source register $R_X$ into another one of the registers 18(0-X) (here, target register $R_1$). In some embodiments, the MOV instruction 140 may be fetched immediately following the MOV instruction 132 in the detected instruction stream 130, while according to some embodiments, the MOV instruction 132 and the MOV instruction 140 may be separated in the detected instruction stream 130 by other intervening instructions. As before, the source register $R_X$ does not have a pipeline indicator set in the identification-based pipeline issuance table 128; thus, as indicated by pipeline issuance arrow 142, the MOV instruction 140 is issued to one of the execution pipelines 12(0-Q) (here, pipeline $P_1$) based on default execution pipeline issuance logic. The identification-based pipeline issuance table 128 is then updated to set a pipeline indicator 144 corresponding to the target register $R_1$ and the execution pipeline $P_1$. In this regard, the pipeline indicator 144 stores an identification of the execution pipeline $P_1$ to indicate that the MOV instruction 140, which is the most recent instruction to target register $R_1$ for writing, was issued to the execution pipeline $P_1$. A validity bit 145 corresponding to the pipeline indicator 144 is also set, to indicate that the pipeline indicator 144 is valid for use in determining an execution pipeline preference for target register $R_1$.

The instruction processing circuit 14 next detects an ARM architecture ADD instruction 146 in the detected instruction stream 130. The ADD instruction 146 indicates an operation to sum the contents of the source registers $R_0$ and $R_1$, and store the result in the target register $R_2$. In some embodiments, the ADD instruction 146 may be fetched immediately following the MOV instruction 140 in the detected instruction stream 130, while according to some embodiments, the MOV instruction 140 and the ADD instruction 146 may be separated in the detected instruction stream 130 by other intervening instructions.

After the ADD instruction 146 is detected, the identification-based pipeline issuance table 128 is accessed by the instruction processing circuit 14 (as indicated by arrow 136) to determine whether a pipeline indicator is set in either or both of a row 148 corresponding to the source register $R_0$, and a row 150 corresponding to the source register $R_1$. In this example, the pipeline indicator 138 in the identification-based pipeline issuance table 128 indicates that the most recent instruction to target the source register $R_0$ for writing (here, the MOV instruction 132) was issued to the execution pipeline $P_0$. Additionally, the pipeline indicator 144 in the identification-based pipeline issuance table 128 indicates that the most recent instruction to target the source register $R_1$ for writing (in this example, the MOV instruction 140) was issued to the execution pipeline $P_1$. Based on the pipeline indicator 138 and the pipeline indicator 144, the instruction processing circuit 14 determines two execution pipeline preferences 152, indicating that the ADD instruction 146 should be preferentially issued to either the execution pipeline $P_0$ or the execution pipeline $P_1$.

As noted above, in some embodiments, there may be no guarantee that the ADD instruction 146 will be issued to either of the particular ones of the execution pipelines 12(0-Q) indicated by the execution pipeline preferences 152, as other factors may be taken into consideration in determining the most appropriate one of the execution pipelines 12(0-Q) for an instruction. Likewise, some embodiments may apply additional execution pipeline issuance logic to select from among a plurality of preferred execution pipelines when more than one execution pipeline preferences are determined by the instruction processing circuit. In this example, the ADD instruction 146 is issued to the preferred execution pipeline $P_1$, as indicated by pipeline issuance arrow 154. A pipeline indicator 156 and a validity bit 157, corresponding to the target register $R_2$ and the execution pipeline $P_1$, are then updated in the identification-based pipeline issuance table 128.

The instruction processing circuits operable for issuing instructions to execution pipelines based on register-associated preferences, according to embodiments disclosed herein, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 7:
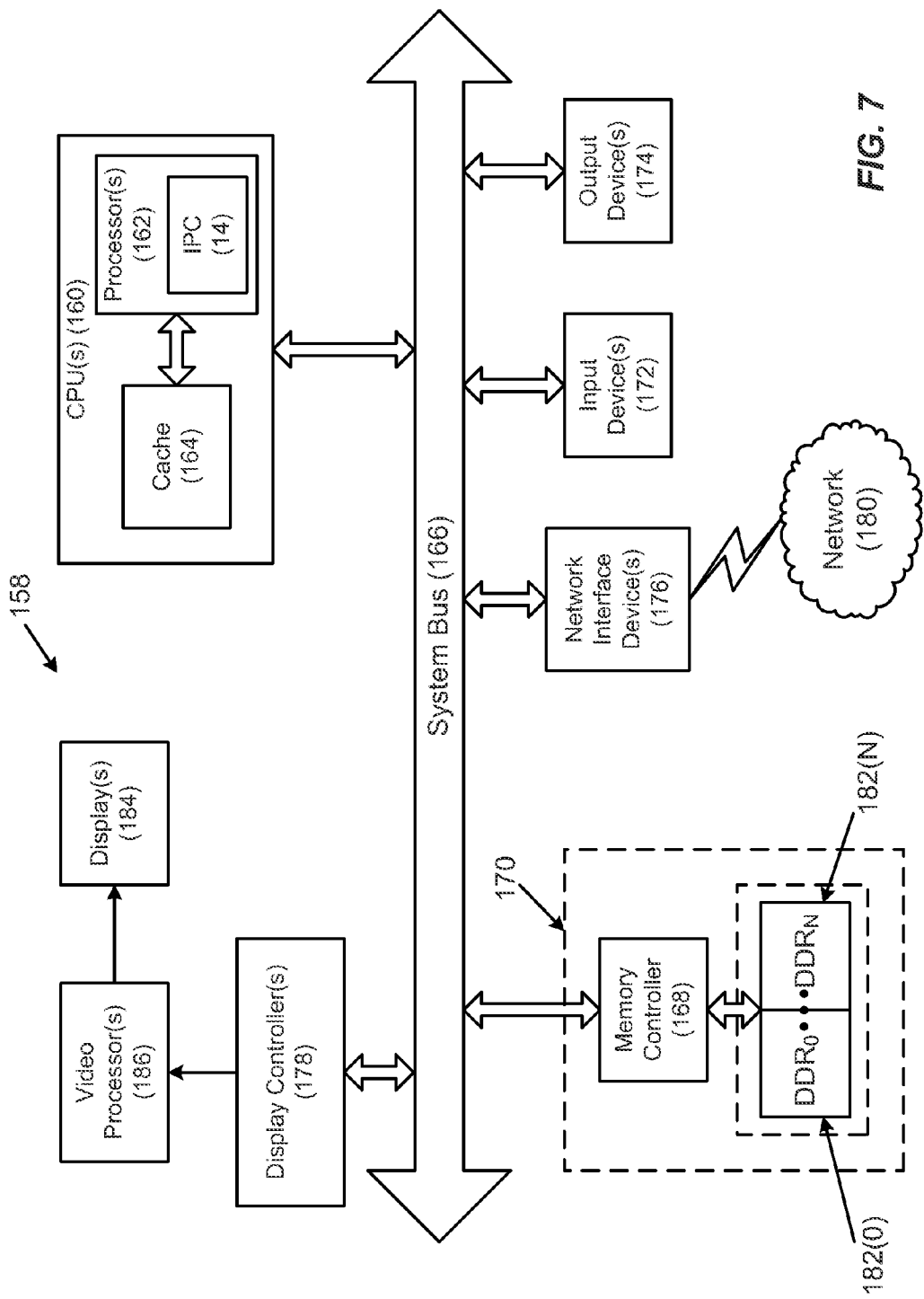
FIG. 7 is a block diagram of an exemplary processor-based system that can include instruction processing circuits, including the instruction processing circuit of FIG. 1, configured to issue instructions to execution pipelines based on register-associated preferences.

In this regard, FIG. 7 illustrates an example of a processor-based system 158 that can employ the instruction processing circuit 14 illustrated in FIG. 1. In this example, the processor-based system 158 includes one or more central processing units (CPUs) 160, each including one or more processors 162. The processor(s) 162 may comprise the instruction processing circuit (IPC) 14. The CPU(s) 160 may have cache memory 164 coupled to the processor(s) 162 for rapid access to temporarily stored data. The CPU(s) 160 is coupled to a system bus 166 and can intercouple master and slave devices included in the processor-based system 158. As is well known, the CPU(s) 160 communicates with these other devices by exchanging address, control, and data information over the system bus 166. For example, the CPU(s) 160 can communicate bus transaction requests to a memory controller 168, as an example of a slave device. Although not illustrated in FIG. 7, multiple system buses 166 could be provided.

Other master and slave devices can be connected to the system bus 166. As illustrated in FIG. 7, these devices can include a memory system 170, one or more input devices 172, one or more output devices 174, one or more network interface devices 176, and one or more display controllers 178, as examples. The input device(s) 172 can include any type of input device, including but not limited to input keys, switches, voice processors, etc. The output device(s) 174 can include any type of output device, including but not limited to audio, video, other visual indicators, etc. The network interface device(s) 176 can he any device(s) configured to allow exchange of data to and from a network 180. The network 180 can be any type of network, including but not limited to a wired or wireless network, a private or public network, a local area network (LAN), a wide local area network (WLAN), and the Internet. The network interface device(s) 176 can be configured to support any type of communication protocol desired. The memory system 170 can include one or more memory units 182(0-N).

The CPU(s) 160 may also be configured to access the display controller(s) 178 over the system bus 166 to control information sent to one or more displays 184.The display controller(s) 178 sends information to the display(s) 184 to be displayed via one or more video processors 186, which process the information to be displayed into a format suitable for the display(s) 184. The display(s) 184 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may he employed in any circuit, hardware component, integrated circuit (IC), IC chip, or semiconductor die, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may he embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A method for processing computer instructions, comprising:
   detecting an instruction in an instruction stream;
   upon determining that the instruction specifies at least one source register:
      determining at least one execution pipeline preference for the instruction based on at least one pipeline indicator in a pipeline issuance table, the at least one pipeline indicator associated with the at least one source register and indicating to which execution pipeline a previously issued instruction was issued; and
      issuing the instruction to an execution pipeline based on the at least one execution pipeline preference; and
   upon determining that the instruction specifies at least one target register:
      updating at least one pipeline indicator associated with the at least one target register in the pipeline issuance table based on the execution pipeline to which the instruction is issued.

2. The method of claim 1, wherein issuing the instruction to the execution pipeline comprises issuing the instruction to a preferred execution pipeline indicated by the at least one execution pipeline preference.

3. The method of claim 1, wherein issuing the instruction to the execution pipeline comprises issuing the instruction to an execution pipeline other than a preferred execution pipeline indicated by the at least one execution pipeline preference, based on the at least one execution pipeline preference and other execution pipeline issuance logic.

4. The method of claim 1, further comprising issuing the instruction to the execution pipeline based on default execution pipeline issuance logic upon determining that the instruction does not specify at least one source register.

5. The method of claim 1, wherein determining the at least one execution pipeline preference comprises indicating a preference for at least one execution pipeline for which the at least one pipeline indicator associated with the at least one source register is set.

6. The method of claim 1, wherein determining the at least one execution pipeline preference comprises determining the at least one execution pipeline preference based on default execution pipeline issuance logic if none of the at least one pipeline indicator associated with the at least one source register is set.

7. The method of claim 1, further comprising detecting the instruction as having limited forwarding resources to at least one of a plurality of execution pipelines;
   wherein updating the at least one pipeline indicator associated with the at least one target register comprises setting a pipeline indicator in the pipeline issuance table associated with the at least one target register and the execution pipeline to which the instruction is issued.

8. The method of claim 1, further comprising detecting the instruction as having equal forwarding resources to a plurality of execution pipelines;
   wherein updating the at least one pipeline indicator associated with the at least one target register comprises clearing all pipeline indicators associated with the at least one target register in the pipeline issuance table.

9. The method of claim 1, wherein updating the at least one pipeline indicator associated with the at least one target register in the pipeline issuance table comprises updating one of a plurality of flags corresponding to a respective one of a plurality of execution pipelines.

10. The method of claim 1, wherein updating the at least one pipeline indicator associated with the at least one target register in the pipeline issuance table comprises storing an identification of one of a plurality of execution pipelines.

11. A processor comprising an instruction processing circuit,
   the instruction processing circuit comprising:
      an instruction detection circuit configured to detect an instruction in an instruction stream;
      a pipeline issuance table;
      a source register detection circuit configured to:
         determine whether the instruction specifies at least one source register; and
         responsive to determining that the instruction specifies the at least one source register:
            determine at least one execution pipeline preference for the instruction based on at least one pipeline indicator in the pipeline issuance table, the at least one pipeline indicator associated with the at least one source register and indicating to which execution pipeline a previously issued instruction was issued; and
      a target register detection circuit configured to:
         determine whether the instruction specifies at least one target register; and
         responsive to determining that the instruction specifies the at least one target register:
            update at least one pipeline indicator associated with the at least one target register in the pipeline issuance table based on the execution pipeline to which the instruction is issued;
   the processor configured to issue the instruction to an execution pipeline based on the at least one execution pipeline preference, responsive to the source register detection circuit determining that the instruction specifies the at least one source register.

12. The processor of claim 11 configured to issue the instruction to the execution pipeline by issuing the instruction to a preferred execution pipeline indicated by the at least one execution pipeline preference.

13. The processor of claim 11 further configured to issue the instruction to the execution pipeline based on default execution pipeline issuance logic, responsive to the source register detection circuit determining that the instruction does not specify the at least one source register.

14. The processor of claim 11 comprising the pipeline issuance table configured to store a plurality of flags corresponding to respective ones of a plurality of execution pipelines.

15. The processor of claim 11 comprising the pipeline issuance table configured to store an identification of one of a plurality of execution pipelines.

16. The processor of claim 11 comprising the instruction processing circuit disposed in a circuit comprised from the group consisting of: an instruction fetch circuit, an instruction decode circuit, and an instruction queue.

17. The processor of claim 11 comprising the instruction processing circuit integrated into a semiconductor die.

18. The processor of claim 11 further comprising a device into which the instruction processing circuit is integrated, the device selected from the group consisting of: a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

19. A processor comprising an instruction processing circuit, the instruction processing circuit comprising:
a means for detecting an instruction in an instruction stream;
a means for determining at least one execution pipeline preference for the instruction based on at least one pipeline indicator in a pipeline issuance table responsive to determining that the instruction specifies the at least one source register, the at least one pipeline indicator associated with the at least one source register and indicating to which execution pipeline a previously issued instruction was issued;
a means for issuing the instruction to an execution pipeline based on the at least one execution pipeline preference, responsive to the instruction processing circuit determining that the instruction specifies the at least one source register; and
a means for updating at least one pipeline indicator associated with at least one target register in the pipeline issuance table based on the execution pipeline to which the instruction is issued, responsive to determining that the instruction specifies the at least one target register.

20. A non-transitory computer-readable medium having stored thereon computer-executable instructions to cause a processor to implement a method, comprising:
detecting an instruction in an instruction stream; upon determining that the instruction specifies at least one source register:
determining at least one execution pipeline preference for the instruction based on at least one pipeline indicator in a pipeline issuance table, the at least one pipeline indicator associated with the at least one source register and indicating to which execution pipeline a previously issued instruction was issued; and
issuing the instruction to an execution pipeline based on the at least one execution pipeline preference; and
upon determining that the instruction specifies at least one target register:
updating at least one pipeline indicator associated with the at least one target register in the pipeline issuance table based on the execution pipeline to which the instruction is issued.

21. The non-transitory computer-readable medium of claim 20 having stored thereon the computer-executable instructions to cause the processor to implement the method, wherein issuing the instruction to the execution pipeline comprises issuing the instruction to a preferred execution pipeline indicated by the at least one execution pipeline preference.

22. The non-transitory computer-readable medium of claim 20 having stored thereon the computer-executable instructions to cause the processor to implement the method, further comprising, upon determining that the instruction does not specify at least one source register, issuing the instruction to the execution pipeline based on default execution pipeline issuance logic.

* * * * *